July 3, 1951    E. W. STEVENS    2,559,264
SPRING RETAINER FOR BALANCERS
Original Filed June 27, 1939    3 Sheets-Sheet 1

INVENTOR
*Edward W. Stevens*
BY
*Raymond G. Miller*
ATTORNEY

July 3, 1951  E. W. STEVENS  2,559,264
SPRING RETAINER FOR BALANCERS
Original Filed June 27, 1939  3 Sheets-Sheet 2

INVENTOR
Edward W. Stevens
BY
Raymond G. Mullee
ATTORNEY

July 3, 1951  E. W. STEVENS  2,559,264
SPRING RETAINER FOR BALANCERS
Original Filed June 27, 1939  3 Sheets-Sheet 3

INVENTOR
Edward W. Stevens
BY
Raymond G. Mullee
ATTORNEY

Patented July 3, 1951

2,559,264

UNITED STATES PATENT OFFICE 2,559,264

SPRING RETAINER FOR BALANCERS

Edward W. Stevens, Detroit, Mich., assignor to Chicago Pneumatic Tool Company, New York, N. Y., a corporation of New Jersey Original application June 27, 1939, Serial No. 281,370. Divided and this application December 15, 1943, Serial No. 514,342

2 Claims. (Cl. 185—45)

This invention relates generally to weight balancing devices of the spring counterbalancing type and more particularly to certain improvements in spring retainers facilitating assembly or handling of the counterbalancing spring thereof. This application is a division of copending application Serial No. 281,370, filed June 27, 1939, now Patent No. 2,342,020 granted February 15, 1944.

The improvements of the present invention are disclosed as embodied in a counterbalancer of the kind most commonly used in the suspension of a pneumatic tool, or like article, from an overhead support. The function of the balancer is to equalize the pull of gravity upon the suspended tool or other load to permit a greater ease of manipulation of the tool and to facilitate its movement to and from working position. The mode of operation of the usual balancer and the essential elements comprised therein are well known to those skilled in the art. Included in these elements is a rotatable drum or reel, upon which the suspension cable is wound, and a coil spring which tensions the drum in a direction opposite to that in which it must turn to pay out the cable. Also, a means is customarily provided for adjusting the spring to an initial tension which is sufficient to balance the suspended load in one position. A particular difficulty encountered in assembling and disassembling the majority of balancers used heretofore is the handling of the coil spring. In the usual balancer the spring is inserted in a container formed integrally with the frame work of the balancer or, in some cases, is positioned in the drum itself. Apart from the well recognized fact that handling of a heavy coiled spring is always a hazardous undertaking, the insertion and removal of a spring so positioned has another disadvantage in that it necessitates at least a partial disassembly of the balancer. It is not an uncommon occurrence for a spring to break while in use. When such breakage occurs the balancer is out of use for the rather considerable time necessary for a mechanic to replace the broken spring with a new one.

It was with the object in view of simplifying the handling, insertion and removal of a balancer spring that the present spring retainer has been developed. This retainer consists of a ring which encloses the spring and which forms, in combination with the spring, a unitary spring assembly. The spring and its retainer are shipped and stored as an assembly and are mounted on the balancer in the same manner. The present balancer is so constructed as to provide a mounting for the spring assembly which is entirely independent of the cable drum and which renders the assembly easily accessible for replacement. It is unnecessary to disassemble the balancer mechanism even partially when inserting or removing the present spring assembly, nor is it necessary to remove the balancer from its support or detach the suspended load at this time. The construction of the spring retainer is thought to present a particularly novel and desirable feature in that its inner surface is formed with a plurality of individual contact points so that the spring is engaged only by these several points and is spaced a short distance away from the main surface of the retainer. Such an arrangement greatly facilitates the removal of a broken spring from the retainer since the several coils of the spring may more easily be clamped together before the spring is removed.

The broad object of this invention is to produce a spring counterbalancer having the improved construction discussed above.

More specifically, an object of the invention is to simplify the mounting of a counterbalancing spring to render it more readily accessible for purposes of replacement.

Another object of the invention is to enclose the spring in a retainer of novel construction to form thereby a spring assembly which may be shipped, stored and mounted on the balancer as a unitary element.

Other objects and structural features of the invention will be more apparent from the following detailed description, when read in connection with the accompanying drawings, wherein:

Fig. 5 is a sectional view showing a portion of the balancer as modified for use with two spring assemblies.

Figure 1:
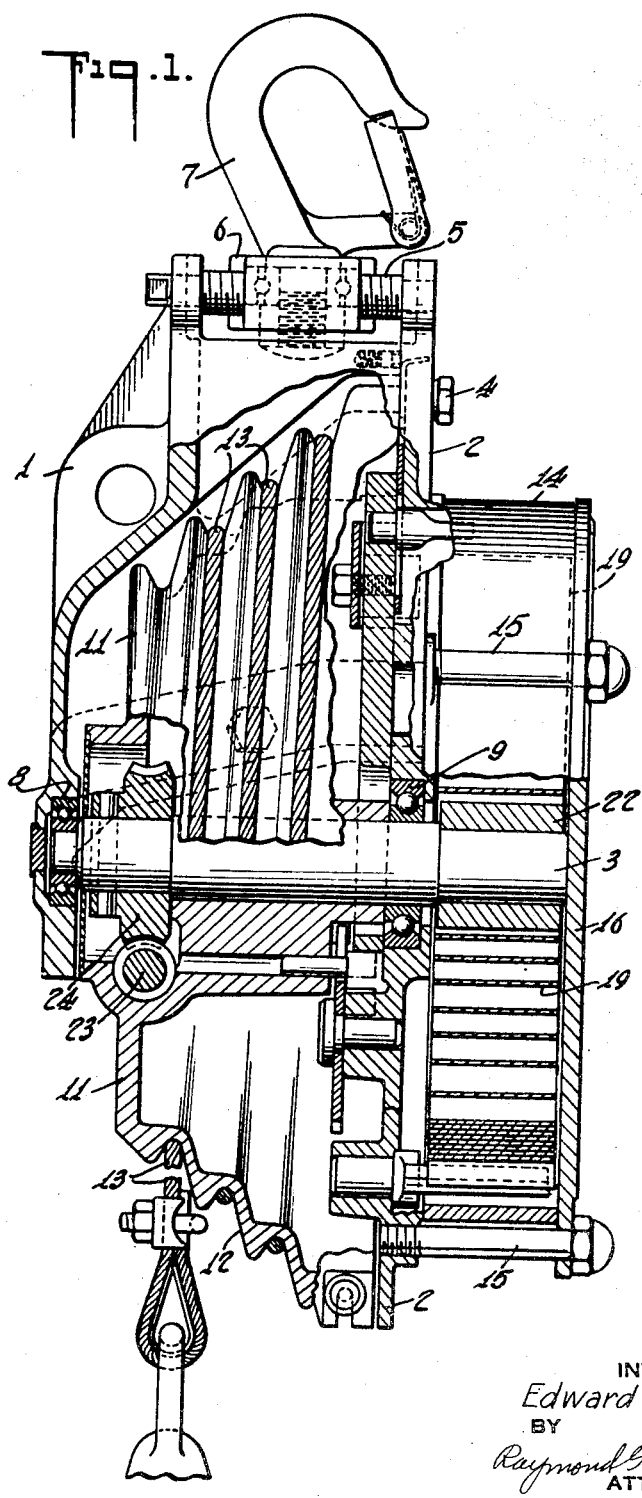
Fig. 1 is a side view, partly in elevation and partly in section, of a balancer embodying the invention.
Figure 2:
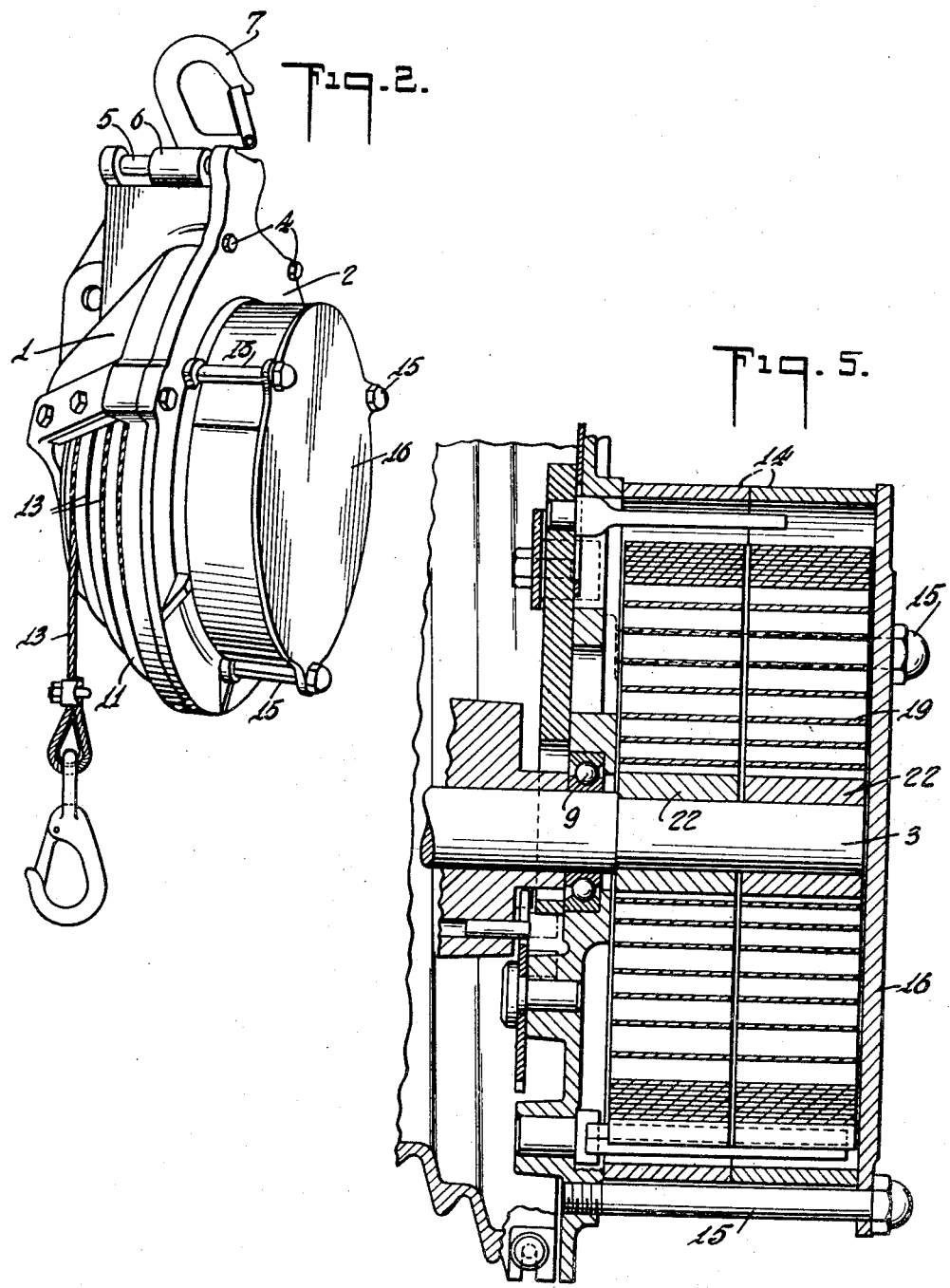
Fig. 2 is a perspective view of the present balancer drawn on a reduced scale.

Referring first to Figs. 1 and 2, it will be seen that the principal supporting elements of the balancer are an outer housing 1, a central bracket 2 and a shaft 3 (Fig. 1). The housing 1 and bracket 2 are rigidly secured together by screws 4 (Fig. 2) and by tie rods 5 which serve the additional function of supporting a ball bearing socket 6 in which is mounted the usual swivel hook 7 by which the balancer is connected to an overhead support. As shown in Fig. 1, bearings 8 and 9 of the usual ball type are supported within recesses in the housing 1 and bracket 2 respectively and support the shaft 3 for rotary movement relative to the housing and bracket, the left end of shaft 3 being reduced in diameter to fit bearing 8.

Adjustably secured to the shaft 3, between the housing 1 and bracket 2, is the cable drum 11. This drum is generally similar to the drum disclosed in the patent to W. H. Benedict, No. 1,794,825, issued March 3, 1931. The drum is preferably constructed as a single piece, is generally conical in shape and formed in its outer surface is a spiraled groove 12 which guides the cable 13.

The spring retainer 14 which forms a part of the spring assembly, is shown in Fig. 1 as positioned to the right of the central bracket 2 and supported by a plurality of posts 15 set in the bracket and projecting laterally therefrom. In the device shown there are three such posts 15, spaced equal distances apart and positioned near the ring of the bracket (see Fig. 2). The retainer consists primarily of a retaining element in the form of a simple ring which can be placed inside the posts 15 and held flush against the bracket 2 by a cover 16 bolted to the posts 15. The retainer shown in the drawings, however, has, in addition to the ring 14, an inner lining strip 17 (see Figs. 3 and 4) fixed to the inner surface of the ring and bent inward, at spaced intervals, to provide a series of contact points 18 in the form of semi-loops. A coil spring 19 is mounted within the retainer. When the spring 19 is in completely expanded position, the outer coil thereof engages merely the several contact points 18, and is spaced a short distance away from the relatively flat portion of the strip 17 and from the ring 14. A spring retainer using a series of discrete contact points has many advantages not present in a retainer wherein the spring presses directly upon the inner surface of the retaining ring. Among these advantages is the greater ease and safety with which the spring may be inserted in the retainer or removed therefrom. Another advantage lies in the fact that undesirable friction between the spring and the retainer is reduced to a minimum. With further regard to the construction of the spring retainer, it will be apparent that the lining strip 17 is used here merely as a mechanical expedient since the ring 14 could itself be quite easily formed with contact points 18 and a retainer of one piece construction thus produced.

Considering now the manner of tensioning the spring 19, it will be observed that the outer end of the spring is fixed to an anchor post 21 set in the fixed bracket 2. The inner end of the spring engages a groove cut in a collar 22 surrounding the right-hand or outer end of the shaft 3 which, as is shown in Fig. 1, extends through and beyond the bracket 2. The outer end of the shaft 3 and the inner surface of the collar 22 are substantially oval in shape, the arrangement being such that the collar is forced to rotate with the shaft but may be moved relatively thereto in a longitudinal direction during assembly or disassembly. It will thus be seen that movement of the shaft 3 in a counterclockwise direction, as viewed in Figs. 3 and 4, will wind or tension the spring 19, the amount of tension depending on the position of the shaft 3 relative to the fixed housing 1. As is well known in the art, a preliminary to the operation of a spring balancer is the setting of the spring to a minimum or "initial tension," which tension is of course determined by the weight of the article intended to be balanced or suspended. This setting of the spring is done by hand and is accomplished, in the present instance, by turning the shaft 3 relative to drum 11 while the latter is held immovable at the extreme limit of its cable winding movement. The adjustment is effected by a worm 23 (Fig. 1) which engages a worm gear 24 fast on the shaft 3 near its left-hand end. The worm 23 is positioned in a channel in the cable drum 11 and has, on its outer end, a head (not shown) which may be engaged by a crank to rotate the worm, the gear 24, and the shaft 3 to tension the spring 19 the desired minimum amount. The worm cannot, of course, be turned by the worm gear, so that although the spring tension may be increased by rotation of the cable drum in the load lowering direction, it cannot be reduced below the initial amount except by manual rotation of the crank, or upon breakage of the spring.

As the drum 11 rotates, therefore, to pay out the cable 13 and lower the suspended article, it carries shaft 3 in unison therewith in a counterclockwise direction (Fig. 3), and further tensions the spring 19. An approximately uniform balancing force is maintained notwithstanding the increasing tension of the spring, by reason of the progressively greater leverage afforded by the gradually increasing diameter of the cable groove 12. This subject of balance and balance range is considered in greater detail in the previously mentioned patent to Benedict. Return of the cable drum to normal will, of course, unwind the spring to its initial tension.

Figure 3:
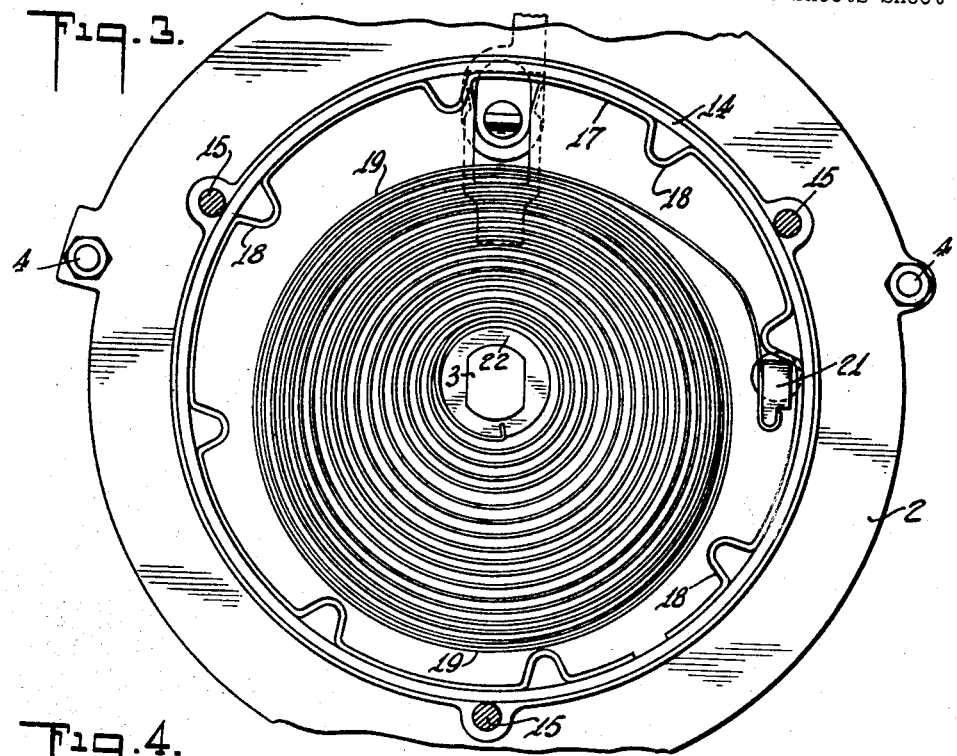
Figs. 3 and 4 are elevations of the spring assembly as mounted upon the balancer, Fig. 3 showing the normal condition of the spring when wound to initial tension, and Fig. 4 the condition of the spring when broken.
Figure 4:
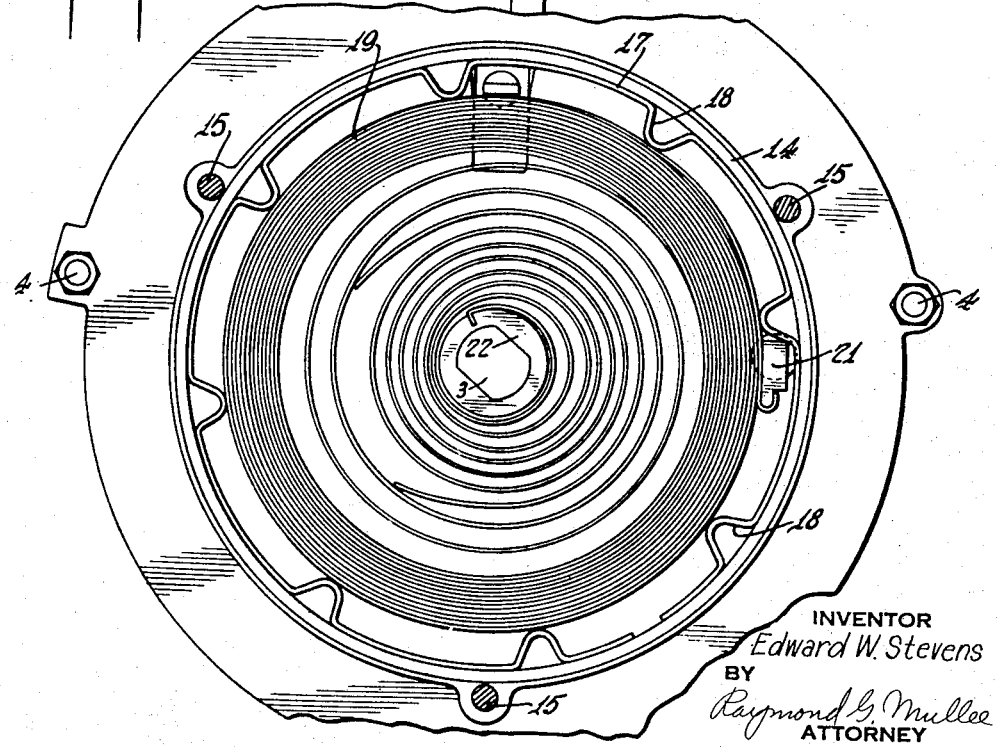

During the operation of the balancer the spring 19 winds and unwinds to and from its initial position of Fig. 3, but if during the course of such operation the spring should break, it would immediately expand to the position disclosed in Fig. 4. In both Figs. 3 and 4 is shown how the inwardly bent and spaced points or projections 18 on strip 17 provide convenient clearance spaces between the spring and the strip and the spring retainer or barrel 14, so as to allow access to the outside of the spring for retaining a grip on the latter when the same is to be replaced. As the outer end is readily slipped off from the anchor post 21 and the inner end with the collar 22 has easily slipped off from shaft 3, it is evident that removal and replacement of the spring may readily be accomplished.

An important feature of the present balancer is the ease with which it may be adapted for use with a plurality of spring assemblies. In Fig. 5 is shown a section of a balancer modified by having two springs 19 enclosed by separate spring retainers 14. To accommodate the additional spring retainer it is merely necessary to lengthen the shaft 3, as well as supporting posts 15, etc. It will be noted that each retaining ring 14 is of slightly greater width than the spring which it encloses. This construction renders the handling of a spring assembly easier and safer and serves a particular function in that it prevents contact of one spring with another and prevents contact of a spring with the bracket 2 or cover 16.

What is claimed is:

1. An assembly comprising an open sided retainer element, and a spirally coiled spring positioned within the retainer element and having anchor means at its outer end to anchor said end with respect to the retainer element to prevent relative movement therebetween when the assembly is in operative use, and an anchor means on the inner end of the spring to couple with a relatively movable element, said retainer element being of greater width than the spring and having several contact points projecting inwardly from the surface thereof, said contact points being spaced circumferentially so that the distance between any two adjacent contact points is substantially less than 180° and being further arranged to engage the outer coil of the spring and maintain the latter in spaced relationship to the retainer element so that tool means can be clamped about the spring from either side of the retainer element and at various points of the spring periphery between the contact points while the spring is positioned within the retainer element.

2. An assembly comprising an open sided retainer element, a lining strip mounted on the inner surface of the retainer element, and a spirally coiled spring positioned within the retainer element and having anchor means at its outer end to anchor said end with respect to the retainer element to prevent relative movement therebetween when the assembly is in operative use, and an anchor means on the inner end of the spring to couple with a relatively movable element, said retainer element being of greater width than the spring, said lining strip having several contact points extending inwardly relative to the retainer element and being spaced circumferentially so that the distance between any two adjacent contact points is substantially less than 180° and further adapted to engage the outer coil of the spring and maintain the latter in spaced relationship to the retainer element so that tool means can be clamped about the spring from either side of the retainer element and at various points of the spring periphery between the contact points while the spring is positioned within the retainer element.

EDWARD W. STEVENS.

REFERENCES CITED

The following references are of record in the file of this patent:

UNITED STATES PATENTS

| Number | Name | Date |
| --- | --- | --- |
| 296,738 | Fawkes | Apr. 15, 1884 |
| 774,525 | Mack | Nov. 8, 1904 |
| 915,288 | Hagstrom | Mar. 16, 1909 |
| 1,138,738 | Earll | May 11, 1915 |
| 1,645,254 | Pederson | Oct. 11, 1927 |
| 1,677,045 | Odom | July 10, 1928 |
| 2,078,489 | Forss | Apr. 27, 1937 |
| 2,094,182 | Nash | Sept. 28, 1937 |
| 2,342,020 | Stevens | Feb. 15, 1944 |